US 12,159,340 B2

United States Patent
Liao et al.

(10) Patent No.: US 12,159,340 B2
(45) Date of Patent: Dec. 3, 2024

(54) SYSTEM, APPARATUS, AND METHOD FOR CLONING CLOTHINGS FROM REAL-WORLD IMAGES TO 3D CHARACTERS

(71) Applicant: Inception Institute of Artificial Intelligence Limited, Abu Dhabi (AE)

(72) Inventors: Shengcai Liao, Abu Dhabi (AE); Yanan Wang, Abu Dhabi (AE)

(73) Assignee: Inception Institute of Artificial Intelligence Limited, Abu Dhabi (AE)

(*) Notice: Subject to any disclaimer, the term of this patent is extended or adjusted under 35 U.S.C. 154(b) by 0 days.

(21) Appl. No.: 17/705,518

(22) Filed: Mar. 28, 2022

(65) Prior Publication Data

US 2023/0306673 A1  Sep. 28, 2023

(51) Int. Cl.
| | |
|---|---|
| *G06T 13/40* | (2011.01) |
| *G06T 7/529* | (2017.01) |
| *G06T 15/04* | (2011.01) |
| *G06V 10/26* | (2022.01) |

(52) U.S. Cl.
CPC .............. *G06T 15/04* (2013.01); *G06T 7/529* (2017.01); *G06T 13/40* (2013.01); *G06V 10/26* (2022.01); *G06T 2207/20084* (2013.01)

(58) Field of Classification Search
CPC ......... G06T 15/04; G06T 7/529; G06T 13/40; G06T 2207/20084; G06V 10/26
See application file for complete search history.

(56) References Cited

U.S. PATENT DOCUMENTS

| | | | |
|---|---|---|---|
| 2021/0134056 A1* | 5/2021 | He | ........................ G06T 19/20 |
| 2022/0189087 A1* | 6/2022 | Shuvi | ........................ G06T 5/50 |
| 2022/0237879 A1* | 7/2022 | Wu | ........................ G06T 15/04 |

OTHER PUBLICATIONS

"Learning to Transfer Texture from Clothing Images to 3D Humans." Mir et al. CoRR. Mar. 10, 2020. Abs/2003.02050. https://arxiv.org/abs/2003.02050. (Year: 2020).*

* cited by examiner

*Primary Examiner* — Antonio A Caschera

(57) ABSTRACT

A method for rendering a three-dimensional (3D) character using the clothing image in an input image. The method generates a UV map based on the clothing image in an input image and a UV-map template, and then renders the 3D character using the generated UV map. Various methods may be used to fill the UV-map template based on the clothing image for generating the UV map. For example, the front-side clothing area of the UV-map template may be filled with the texture cloned from the clothing image using a registered mapping method, and the rear-side clothing area of the UV-map template may be filled with the texture of a homogeneous block of the clothing image using a homogeneous expansion method.

20 Claims, 8 Drawing Sheets

SYSTEM, APPARATUS, AND METHOD FOR CLONING CLOTHINGS FROM REAL-WORLD IMAGES TO 3D CHARACTERS

FIELD OF THE DISCLOSURE

The present disclosure relates generally to system, apparatus, and method for rendering three-dimensional (3D) characters, and in particular to system, apparatus, and method for cloning clothings from real-world images to 3D characters.

BACKGROUND

For ease of reading, subsection G of the Detailed Description lists the references cited herein, the content of each of which is incorporated herein by reference in its entirety.

Technologies of generation and rendering of three-dimensional (3D) human-like or humanoid characters in computer graphics are known. For example, References [1] and [2] teach methods of generating characters using MakeHuman (which is an open source 3D computer graphics middleware developed by the MakeHuman team for the prototyping of photorealistic humanoids) with the flexibility of scaling-up.

Reference [3] teaches methods for transferring two-dimensional (2D) clothing images onto skinned multi-person linear (SMPL) models by learning dense correspondences between 2D garment silhouettes and UV maps of 3D garment surfaces. Other methods, such as the method disclosed in Reference [4], infer texture and geometry in the UV-space of the SMPL model using an image-to-image translation method. They also introduce a model to automatically learn correlations from persons' actual appearances and then output a full 3D texture, which could create a virtual character that looks like the input person image. The CMR method (see Reference [5]) introduces texture inference as prediction of an image in a canonical appearance space and optimizes the perceptual metric between the rendered image and the input image. The RSTG method (see Reference [6]) teaches a method to generate textures of human bodies under the supervision of person re-identification (re-ID), which utilizes the distance metric learned by the re-ID task. Reference [7] teaches a texture transfer model HPBTT to effectively generate textures of the 3D human body from a single image via cross-view consistency learning to reduce the gap between real and virtual characters.

However, the above-described rendering methods have disadvantages. For example, in the methods disclosed in References [1] and [2], the synthesized persons in existing datasets are different from realistic persons because synthesized persons are mostly cartoon-like and dress in random collocation. The method disclosed in Reference [3] requires the input of both the front-view and back-view images of the clothing, which is inconvenient. Other methods such as CMR and HPBTT (see References [5] and [6]) are based on generative models, which usually result in blurred texture and artifacts. Moreover, they do not have independent clothing models, and therefore the generated texture with body SMPL model appears like drawings on bodies.

SUMMARY

Embodiments herein relate to one or more computing devices, computer network systems, computerized methods, and computer readable storage devices or media for computer graphics and image processing, and in particular related to one or more computing devices, computer network systems, computerized methods, and computer readable storage devices for "cloning", copying, or mapping the clothing in an input image having suitable perspective view of a person to a 3D character or humanoid.

The computing devices, computer network systems, computerized methods, and computer readable storage devices may be used in various applications. For example, in some embodiments, the computing devices, computer network systems, computerized methods, and computer readable storage devices may be used for person re-identification (a computer-vision application in computer science). Specifically, the computing devices, computer network systems, computerized methods, and computer readable storage devices may be used for generating virtual datasets and use them for training artificial intelligence (AI) systems and, for example, neural networks to perform person re-identification and retrieval.

According to one aspect of this disclosure, there is provided a computerized method comprising: generating a UV map based on a clothing image in an input image and a UV-map template; and rendering a three-dimensional (3D) character using the UV map.

In some embodiments, said generating the UV map comprises: determining a plurality of first keypoints of the clothing image; and generating the UV map by rendering a first clothing area of the UV-map template based on the plurality of first keypoints of the clothing image and a plurality of second keypoints of the first clothing area.

In some embodiments, said determining the plurality of first keypoints of the clothing image comprises: determining the plurality of first keypoints of the clothing image using one or more artificial intelligence (AI) models.

In some embodiments, said generating the UV map comprises: determining a homography matrix based on the plurality of first keypoints of the clothing image and the plurality of second keypoints of the first clothing area; and for each pixel of the first clothing area, determining a corresponding location on the clothing image using the determined homography matrix, and determining a texture of the pixel of the first clothing area based on one or more textures of one or more pixels of the clothing image at or about the determined location.

In some embodiments, said determining the texture of the pixel of the first clothing area comprises: determining the texture of the pixel of the first clothing area using interpolation of the textures of a plurality of pixels of the clothing image at or about the determined location.

In some embodiments, the interpolation of the textures is bilinear interpolation of the textures.

In some embodiments, said generating the UV map comprises: determining a homogeneous block of the clothing image; and rendering a second clothing area of the UV-map template based on the determined homogeneous block.

In some embodiments, said determining the homogeneous block of the clothing image comprises: extracting a feature map of the clothing image using a neural network model; determining a plurality of blocks of various sizes on the feature map; calculating standard deviation of feature values of each of the plurality of blocks; calculating an area of each of the plurality of blocks; and selecting one of the plurality of blocks having a smallest ratio of a weighted standard deviation of the feature values thereof over a weighted area thereof as the homogeneous block.

In some embodiments, the feature map is a layer-2 feature map of the clothing image.

In some embodiments, said rendering the second clothing area of the UV-map template comprises: scaling the homogeneous block; and rendering the second clothing area of the UV-map template using the scaled homogeneous block.

In some embodiments, said rendering the second clothing area of the UV-map template using the scaled homogeneous block comprises: rendering the second clothing area of the UV-map template by alternately flipping and tiling the scaled homogeneous block in the second UV map.

In some embodiments, the computerized method further comprises: clustering a plurality of first images into one or more clusters at least based on similarities of person images in the first images; sampling each of the one or more clusters to obtain one or more sampled first images; and using each of the one or more sampled first images as the input image for performing said generating the UV map and said rendering the 3D character to obtain a plurality of rendered 3D characters.

According to one aspect of this disclosure, there is provided an apparatus comprising a processing structure for: generating a UV map based on a clothing image in an input image and a UV-map template; and rendering a three-dimensional (3D) character using the UV map.

In some embodiments, said generating the UV map comprises: determining a homogeneous block of the clothing image; and rendering a second clothing area of the UV-map template based on the determined homogeneous block.

In some embodiments, the processing structure is further configured for: clustering a plurality of first images into one or more clusters at least based on similarities of person images in the first images; sampling each of the one or more clusters to obtain one or more sampled first images; and using each of the one or more sampled first images as the input image for performing said generating the first UV map and said rendering the 3D character to obtain a plurality of rendered 3D characters.

According to one aspect of this disclosure, there is provided one or more non-transitory computer-readable storage devices comprising computer-executable instructions. The instructions, when executed, cause a processing structure to perform actions comprising: generating a UV map based on a clothing image in an input image and a UV-map template; and rendering a three-dimensional (3D) character using the UV map.

In some embodiments, said generating the UV map comprises: determining a plurality of first keypoints of the clothing image; and generating the UV map by rendering a first clothing area of the UV-map template based on the plurality of first keypoints of the clothing image and a plurality of second keypoints of the first clothing area.

In some embodiments, said generating the UV map comprises: determining a homography matrix based on the plurality of first keypoints of the clothing image and the plurality of second keypoints of the first clothing area; and for each pixel of the first clothing area, determining a corresponding location on the clothing image using the determined homography matrix, and determining a texture of the pixel of the first clothing area based on one or more textures of one or more pixels of the clothing image at or about the determined location.

In some embodiments, said determining the texture of the pixel of the first clothing area comprises: determining the texture of the pixel of the first clothing area using interpolation of the textures of a plurality of pixels of the clothing image at or about the determined location.

In some embodiments, the interpolation of the textures is bilinear interpolation of the textures.

In some embodiments, said generating the UV map comprises: determining a homogeneous block of the clothing image; and rendering a second clothing area of the UV-map template based on the determined homogeneous block.

In some embodiments, said determining the homogeneous block of the clothing image comprises: extracting a feature map of the clothing image using a neural network model; determining a plurality of blocks of various sizes on the feature map; calculating standard deviation of feature values of each of the plurality of blocks; calculating an area of each of the plurality of blocks; and selecting one of the plurality of blocks having a smallest ratio of a weighted standard deviation of the feature values thereof over a weighted area thereof as the homogeneous block.

In some embodiments, the feature map is a layer-2 feature map of the clothing image.

In some embodiments, the instructions, when executed, cause the processing structure to perform further actions comprising: clustering a plurality of first images into one or more clusters at least based on similarities of person images in the first images; sampling each of the one or more clusters to obtain one or more sampled first images; and using each of the one or more sampled first images as the input image for performing said generating the first UV map and said rendering the 3D character to obtain a plurality of rendered 3D characters.

BRIEF DESCRIPTION OF THE DRAWINGS

For a more complete understanding of the disclosure, reference is made to the following description and accompanying drawings, in which.

DETAILED DESCRIPTION

Embodiments herein relate to one or more computing devices, computer network systems, computerized methods, and computer readable storage devices or media for "clone", copy, or map the clothing in an input image having suitable perspective view of a person to a 3D character or humanoid.

In some embodiments, a registered mapping method is used for cloning, copying, or mapping the clothing in the input image to a first side (such as the front side) of the 3D character. The registered mapping method generates a first UV map using the clothing in the input image and then renders the 3D character using the generated first UV map.

In some embodiments, the registered mapping method applies perspective homography to warp the clothing to the first UV map.

In some embodiments, a homogeneous expansion method is used for rendering a second side (such as the rear side) of the 3D character using a portion of the clothing in the input image.

In some embodiments, an optimization method is used for finding a large homogeneous area on clothing, using it as a realistic clothing pattern or cell, and expanding the clothing cell to fill the a second UV map which is then used for rendering the second side of the 3D character.

In some embodiments, a scaling method is used for aligning the textures of the first and second UV maps.

In some embodiments, a similarity-diversity expansion method is used for clustering person images and sampling the clustered images in a controlled manner for 3D character generation and rendering, so as to scale up 3D character creation densely in visual similarity and diversely in population.

In some embodiments, the generated 3D characters may be imported into a suitable virtual environments to render a more realistic virtual dataset.

By using the methods disclosed herein, the rendering of 3D characters based on the input images may be performed efficiently, and the generated virtual 3D characters appear similar to their real-world counterparts with clear clothing textures.

A. COMPUTING DEVICE HARDWARE AND SOFTER STRUCTURES

Figure 1:
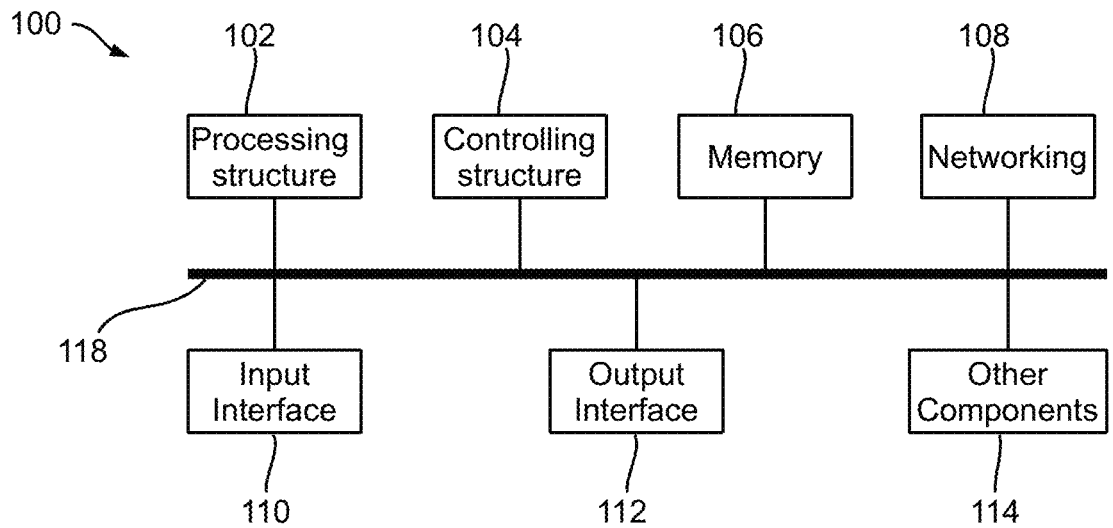
FIG. 1 is a schematic diagram showing a simplified hardware structure of a computing device, according to some embodiments of this disclosure.

Turning now to FIG. 1, a computing device is shown and is generally identified using reference numeral 100. In some embodiments, the computing device may be a portable or non-portable computing devices such as a laptop computer, a tablet, a smartphone, a personal digital assistants (PDA), a desktop computer, a server computer, or the like, that have sufficient computational power to perform the processes disclosed herein. In some other embodiments as will be described in more detail later, the computing device may be a part of a computer network system and may only perform a portion of the processes disclosed herein with the other portion thereof being performed by other computing devices of the computer network system.

As shown in FIG. 1, the computing device 100 in these embodiments comprises a processing structure 102, a controlling structure 104, one or more non-transitory computer-readable memory or storage devices 106, a network interface 108, an input interface 110, and an output interface 112, functionally interconnected by a system bus 118. The computing device 100 may also comprise other components 114 coupled to the system bus 118.

The processing structure 102 may be one or more single-core or multiple-core computing processors or processing units such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like. When the processing structure 102 comprises a plurality of processors, the processors thereof may collaborate via a specialized circuit such as a specialized bus or via the system bus 118.

The processing structure 102 may also comprise one or more graphic processing units (GPUs), real-time processors, programmable logic controllers (PLCs), microcontroller units (MCUs), μ-controllers (UCs), specialized/customized processors and/or controllers using, for example, field-programmable gate array (FPGA) or application-specific integrated circuit (ASIC) technologies, and/or the like.

Generally, each processor of the processing structure 102 comprises necessary circuitries implemented using technologies such as electrical and/or optical hardware components for executing one or more processes as the implementation purpose and/or the use case maybe, to perform various tasks. In many embodiments, the one or more processes may be implemented as firmware and/or software stored in the memory 106. Those skilled in the art will appreciate that, in these embodiments, the one or more processors of the processing structure 102, are usually of no use without meaningful firmware and/or software.

The controlling structure 104 comprises one or more controlling circuits, such as graphic controllers, input/output chipsets, and the like, for coordinating operations of various hardware components and modules of the computing device 100.

The memory 106 comprises one or more non-transitory computer-readable storage devices or media accessible by the processing structure 102 and the controlling structure 104 for reading and/or storing instructions for the processing structure 102 to execute, and for reading and/or storing data, including input data and data generated by the processing structure 102 and the controlling structure 104. The memory 106 may be volatile and/or non-volatile, non-removable or removable memory such as random access memory (RAM), read-only memory (ROM), erasable programmable read-only memory (EPROM), solid-state memory, hard disks, compact disc (CD), digital video disc (DVD), flash memory, or the like. In use, the memory 106 is generally divided into a plurality of portions for different use purposes. For example, a portion of the memory 106 may be used as a storage memory for long-term data storing, for example, for storing files or databases. Another portion of the memory 106 may be used as a working memory for storing data during operation.

The network interface 108 comprises one or more network modules for connecting to other computing devices or networks through a network by using suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G New Radio (5G NR) and/or other 5G networks, and/or the like. In some embodiments, parallel ports, serial ports, USB connections, optical connections, or the like may also be used for connecting other computing devices or networks although they are usually considered as input/output interfaces for connecting input/output devices.

The input interface 110 comprises one or more input modules for one or more users to input data via, for example, touch-sensitive screens, touch-sensitive whiteboards, touch-pads, keyboards, computer nice, trackballs, microphones, scanners, cameras, and/or the like. The input interface 110 may be a physically integrated part of the computing device 100 (for example, the touch-pad of a laptop computer or the touch-sensitive screen of a tablet), or may be a device physically separated from but functionally coupled to, other components of the computing device 100 (for example, a computer mouse). The input interface 110, in some implementation, may be integrated with a display output to form a touch-sensitive screen or a touch-sensitive whiteboard.

The output interface 112 comprises one or more output modules for output data to a user. Examples of the output modules include displays (such as monitors, LCD displays, LED displays, projectors, and the like), speakers, printers, virtual reality (VR) headsets, augmented reality (AR) goggles, and/or the like. The output interface 112 may be a physically integrated part of the computing device 100 (for example, the display of a laptop computer or a tablet), or may be a device physically separate from but functionally coupled to other components of the computing device 100 (for example, the monitor of a desktop computer).

The computing device 100 may also comprise other components 114 such as one or more positioning modules, camera modules, temperature sensors, barometers, inertial measurement units (IMUs), and/or the like. Examples of the positioning modules may be one or more global navigation satellite system (GNSS) components (for example, one or more components for operation with the Global Positioning System (GPS) of USA, Global'naya Navigatsionnaya Sputnikovaya Sistema (GLONASS) of Russia, the Galileo positioning system of the European Union, and/or the Beidou system of China).

The system bus 118 interconnects various components 102 to 114 enabling them to transmit and receive data and control signals to and from each other.

Figure 2:
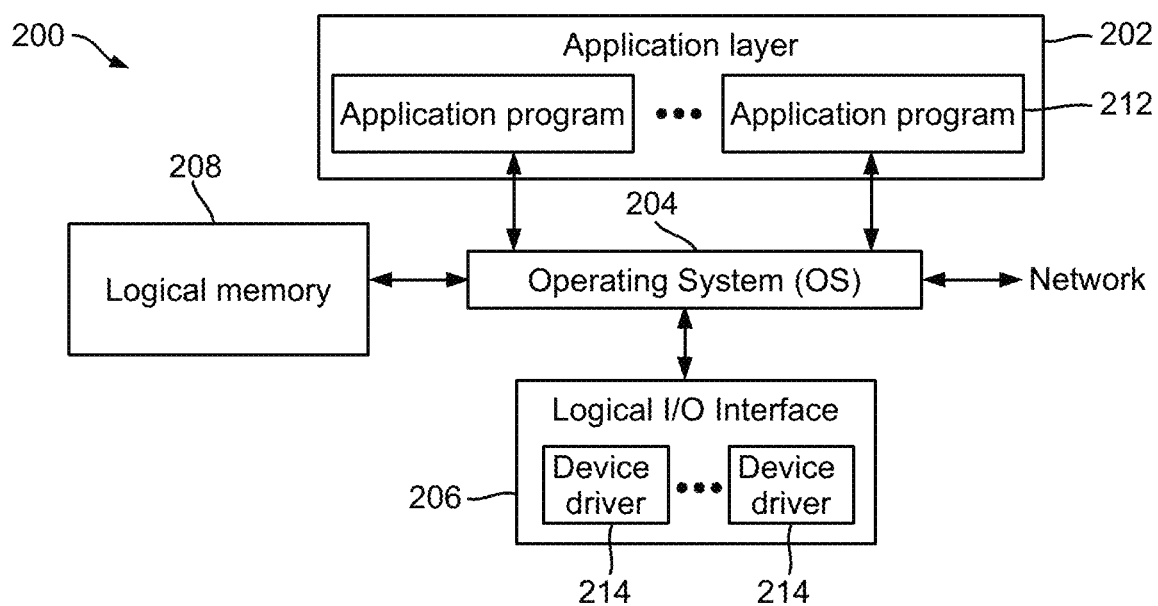
FIG. 2 is a schematic diagram showing a simplified software architecture of the computing device shown in FIG. 1, according to some embodiments of this disclosure.

FIG. 2 shows a simplified software architecture 200 of the computing device 100. The software architecture 200 comprises an application layer 202, an operating system 204, a logical input/output (I/O) interface 206, and a logical memory 208. The application layer 202, operating system 204, and logical I/O interface 206 are generally implemented as computer-executable instructions or code in the form of software programs or firmware programs stored in the logical memory 208 which may be executed by the processing structure 102.

The application layer 202 comprises one or more application programs 212 executed by or performed by the processing structure 102 for performing various tasks.

The operating system 204 manages various hardware components of the computing device 100 via the logical I/O interface 206, manages the logical memory 208, and manages and supports the application programs 212. The operating system 204 is also in communication with other computing devices (not shown) via the network to allow the application programs 212 to communicate with programs running on other computing devices. As those skilled in the art will appreciate, the operating system 204 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google Inc., Mountain View, CA, USA), or the like.

The logical I/O interface 206 comprises one or more device drivers 214 for communicating with respective input and output interfaces 110 and 112 for receiving data therefrom and sending data thereto. Received data may be sent to the application layer 202 for being processed by one or more application programs 212. Data generated by the application programs 212 may be sent to the logical I/O interface 214 for outputting to various output devices (via the output interface 112).

The logical memory 208 is a logical mapping of the physical memory 106 for facilitating the application programs 212 to access. In this embodiment, the logical memory 208 comprises a storage memory area that may be mapped to a non-volatile physical memory such as hard disks, solid-state disks, flash drives, and the like, generally for long-term data storage therein. The logical memory 208 also comprises a working memory area that is generally mapped to high-speed, and in some implementations, volatile physical memory such as RAM, generally for application programs 212 to temporarily store data during program execution. For example, an application program 212 may load data from the storage memory area into the working memory area, and may store data generated during its execution into the working memory area. The application program 212 may also store some data into the storage memory area as required or in response to a user's command.

While not shown, in some embodiments, the computing device 100 may also comprise a database.

B. HUMANOID RENDERING

Herein, the computing device 100 executes one or more application programs 212 such as one or more computer graphics or image-processing programs for establishing and rendering one or more three-dimensional (3D) human-like characters (also called "humanoid" or "virtual persons").

Figure 3A:
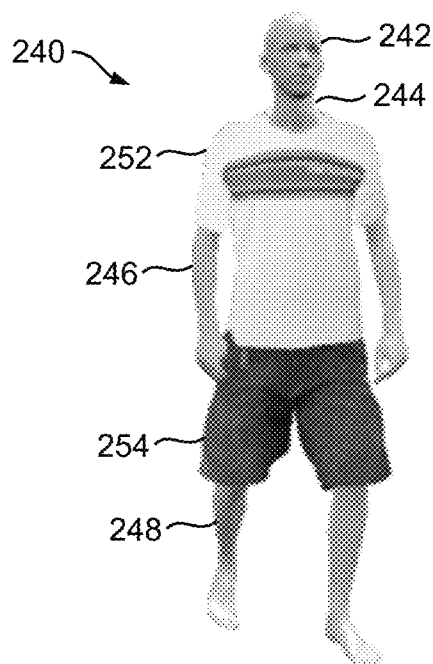
FIGS. 3A and 3B show an example of a 3D humanoid displayed on a display or monitor.
Figure 3B:
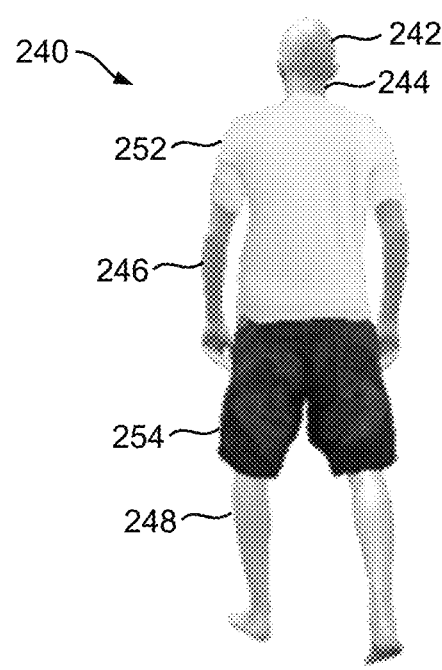

FIGS. 3A and 3B show an example of a 3D humanoid 240 displayed on a display or monitor 112. The computer graphics program first establishes the 3D structure of the 3D humanoid 240 using suitable 3D modeling technologies, wherein the 3D structure usually comprises a plurality of polygons. Then, the computer graphics program renders the 3D surface of the 3D humanoid 240 by filling the polygons with suitable textures or colors.

As can be seen from FIGS. 3A and 3B, the rendering process comprises rendering of at least a portion of the surface of the 3D humanoid 240 itself that is exposed (such as the head 242, neck 244, arms 246, and legs 248 in FIGS. 3A and 3B) and rendering of the surface of the clothing (also called clothes, outfit, dress, or garment) of the 3D humanoid 240 (such as the shirt 252 and the short 254 in FIGS. 3A and 3B). Herein, the term "rendering" refers to the process using one or more textures or colors to fill the 3D surface of a 3D model such as the 3D humanoid 240 to generate a photo-realistic image that is visually similar to an image of a "real" character. Non-photorealistic rendering that purposively renders the 3D humanoid 240 to an unrealistic effect is not considered in this disclosure.

Herein, various methods are disclosed for solving at least some of the disadvantages described in the Background section. In some embodiments, the computing device 100 uses a clothing-clone method to directly "clone", copy, or map the entire clothing from real-world person images to 3D humanoids, such that the virtual persons with the clothing rendered using the "cloned" clothing may appear similar to their real-world counterparts, thereby overcoming the disadvantages wherein the synthesized persons are mostly cartoon-like and dress in random collocation. In some other embodiments, the computing device 100 uses a homogeneous expansion method to automatically generate back-view textures, thereby allowing the use of two-dimensional (2D) images that do not show all views of a person to generate the clothing for 3D humanoids, thereby avoiding the need of using standalone clothes images of front-views and back-views (which may not be available in many cases). In some yet some other embodiments, the computing device 100 uses a registered clothing-mapping method to clone the clothing for avoiding blurred textures and artifacts, thereby avoiding the defected results often seen in conventional methods that use neural networks and generating clear textures.

As those skilled in the art will appreciate, the methods disclosed herein may be combined for use as needed or may be used separately. Moreover, the methods disclosed herein may be combined with any suitable rendering methods if needed.

In some embodiments, the computing device 100 executes a process for automatically cloning or copying clothing image or texture from a real-word image to 3D humanoids, according to some embodiments of this disclosure.

Figure 4A:
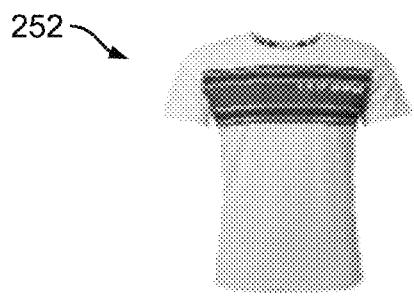
FIGS. 4A and 4B show the front view and rear view of the shirt of the 3D humanoid shown in FIGS. 3A and 3B.
Figure 4B:
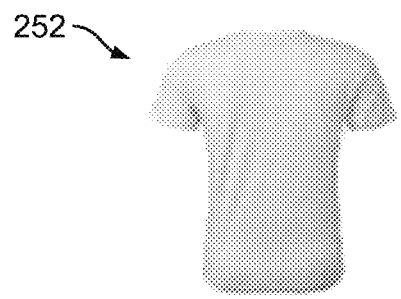
Figure 4C:
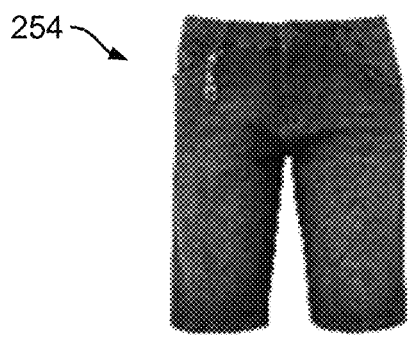
FIGS. 4C and 4D show the front view and rear view of the shorts of the 3D humanoid shown in FIGS. 3A and 3B.
Figure 4D:
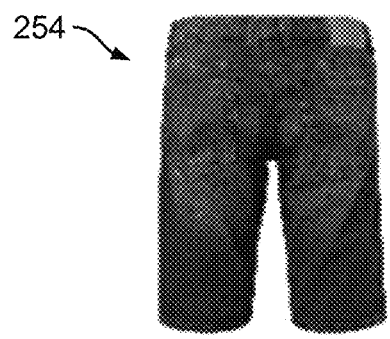

More specifically, the process automatically generates the UV map of a clothing from the real-world image of the clothing, and uses the UV map of to render the 3D model of the clothing worn by the 3D humanoid. As those skilled in the art understand, a UV map is a flattened and mapped topology of a 3D model (such as the 3D model of a clothing) and comprises the model's 3D coordinates (usually denoted using XYZ coordinates) flattened into a 2D space (usually denote using UV coordinates and may further comprise a depth or W coordinate). A UV map of a 3D model is usually established by using a predefined 3D to 2D projection methods projecting the 3D model to the 2D space at predefined views. For example, a UV map for rendering the shirt 252 may comprise predefined projections of the front view of the shirt (see FIG. 4A) and the rear view of the shirt (see FIG. 4B). Similarly, a UV map for rendering the short 254 may comprise predefined projections of the front view of the short (see FIG. 4C) and the rear view of the short (see FIG. 4D). In conventional technologies, a UV mapping extracts textures from the UV map and "warp" the extracted texture to the 3D model (that is, filling the polygons of the 3D model with the extracted textures after distorting the extracted textures based on the positions of the polygons on the 3D model).

However, when using a real-world clothing image to render the clothing of a 3D humanoid, the UV map of the clothing is often unavailable. Moreover, the real-world clothing image (which may be a clothing image without showing the person wearing the clothing or a real-world image showing a person wearing the clothing) generally provides a perspective view from an arbitrary viewpoint or viewing angle. Such a perspective view is generally distorted from the UV map of the clothing.

To solve this issue, the process in these embodiments uses an artificial intelligence (AI) model to derive the UV map from the real-world clothing image. For example, FIG. 5 is a flowchart showing such a process 300 executed by the computing device 100 for automatically cloning or copying clothing image or texture from a real-word image to 3D humanoids.

Figure 5:
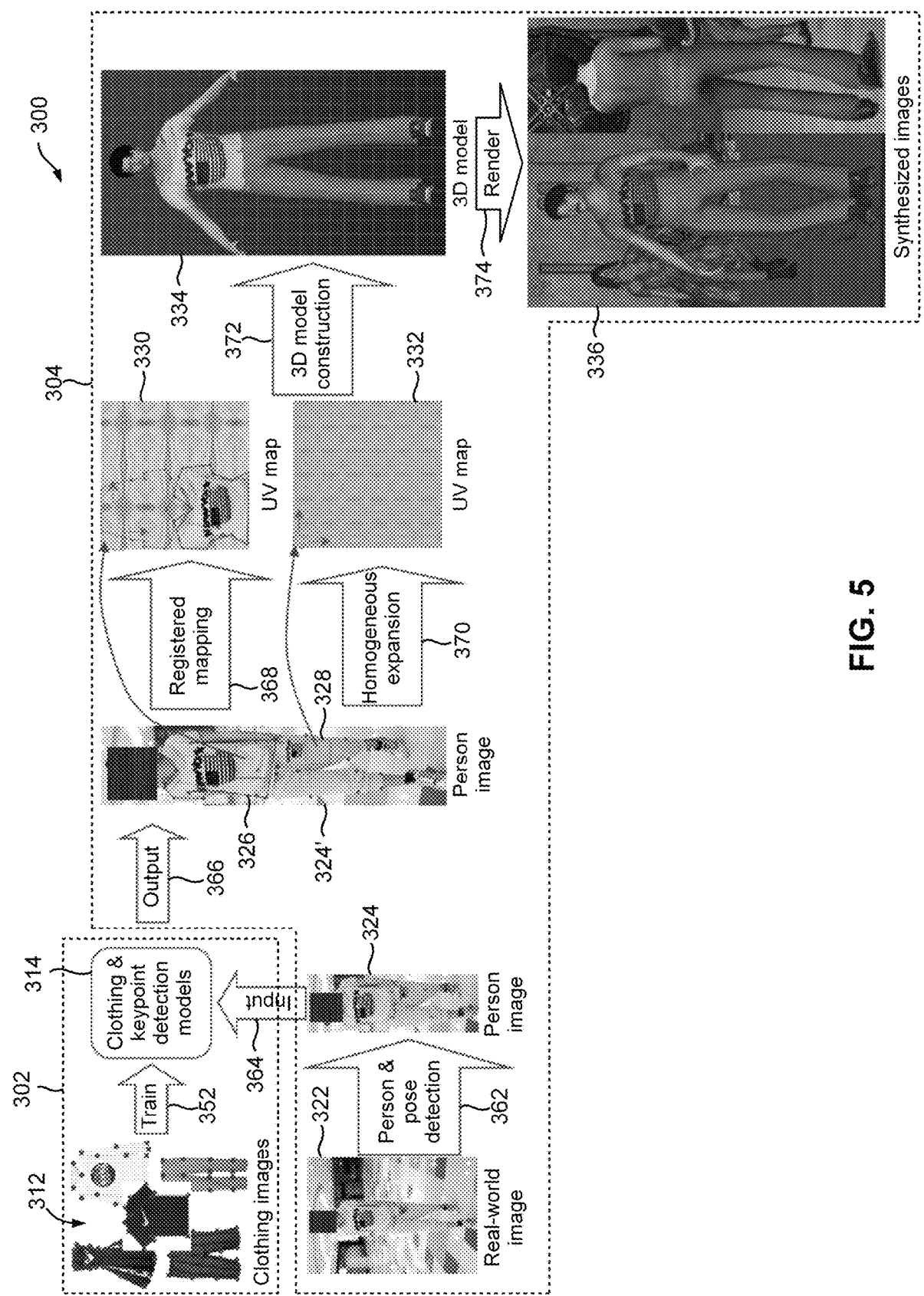
FIG. 5 is a flowchart showing a process executed by the computing device shown in FIG. 1 for automatically cloning or copying clothing image or texture from a real-word image to 3D humanoids, according to some embodiments of this disclosure.

In these embodiments, the process 300 comprises a training subprocess 302 and a rendering subprocess 304 which are both shown in the same flowchart of FIG. 5. However, those skilled in the art will appreciate that, in some embodiments, the training subprocess 302 and the rendering subprocess 304 may be implemented in the same process 300, and in some other embodiments, the training subprocess 302 and the rendering subprocess 304 may be implemented as separate processes.

As shown in FIG. 5, in the training subprocess 302, the computing device 100 executes an artificial intelligence (AI) engine such as a convolutional neural network (CNN) at step 352 to train one or more clothing & keypoint detection models 314 using a plurality of training clothing images 312 such as clothing images obtained from MSMT17 (a multi-scene multi-time person re-identification dataset) by Query-Adaptive Convolution (QAConv) 2.0, which is a person re-identification method. In these embodiments, the clothing & keypoint detection models 314 comprise a clothing detection model for determining the clothing type and the position of the clothing in the clothing image, and a corresponding keypoint detection model for determining the key points of a clothing.

Herein, a plurality of predefined clothing types (also called "clothing models" or "clothing categories") such as shirt, short, pants, skirt, and the like are used. Each clothing type corresponds to one or more predefined UV-map templates. When rendering a 3D humanoid with a type of clothing, the computing device 100 may select (such as randomly select) one of the one or more predefined UV-map templates of the specific type and use the selected UV-map template for generating a UV map using the methods described herein. The generated UV map is then used for rendering the 3D humanoid. In some embodiments, clothing types for different body areas such as an upper-body clothing (for example, a shirt) and a lower-body clothing type (for example, a skirt) may be combined for rendering these body areas at the same time, and the combination thereof may be considered a separate, combined clothing type. The UV maps of these clothing types may accordingly combined to form a separate, combined UV map corresponding to the combined clothing type.

The training clothing images 312 comprise images of a plurality of clothings taken from various viewpoints or viewing angles. The training clothing images 312 are classified into a plurality of predefined clothing types and each clothing type may correspond one or more predefined UV-map templates and UV maps.

Figure 6A:
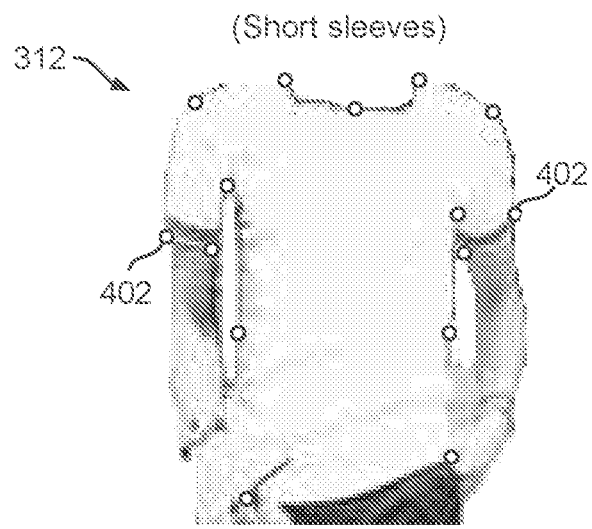
FIG. 6A shows a clothing image with keypoints annotated thereon.
Figure 6B:
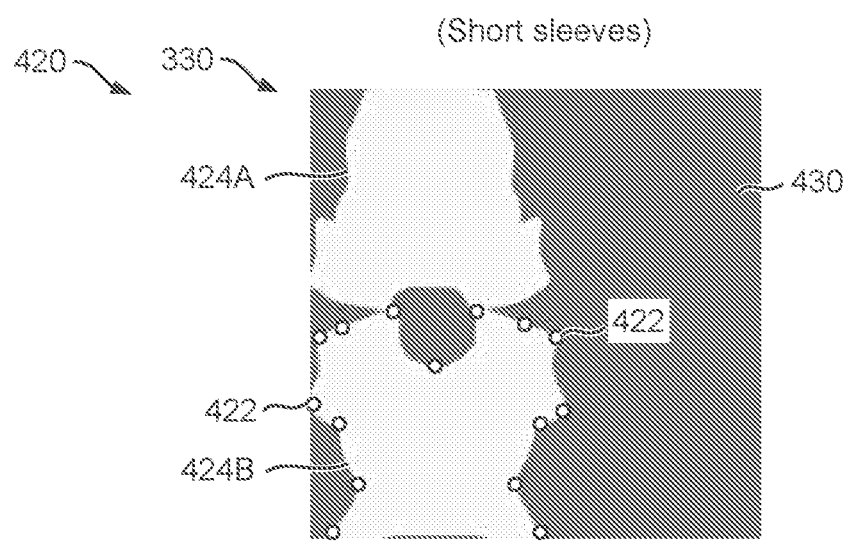
FIG. 6B shows a UV-map template of the clothing image shown in FIG. 6A.

FIGS. 6A and 6B show an example of a clothing image 312 and its corresponding UV-map template 420. As shown in FIG. 6A, a clothing image 312 is annotated or otherwise labelled with a clothing type (such as "short sleeves") and a plurality of key points 402. As shown in FIG. 6B, the UV-map template 420 usually comprises a front-side clothing area 424A and a rear-side clothing area 424B (which are collectively denoted a "clothing area 424" hereinafter) surrounded by a background area 430. The clothing area 424 comprises a plurality of key points 422 corresponding to respective keypoints 402 of the clothing image 312.

Figure 7A:
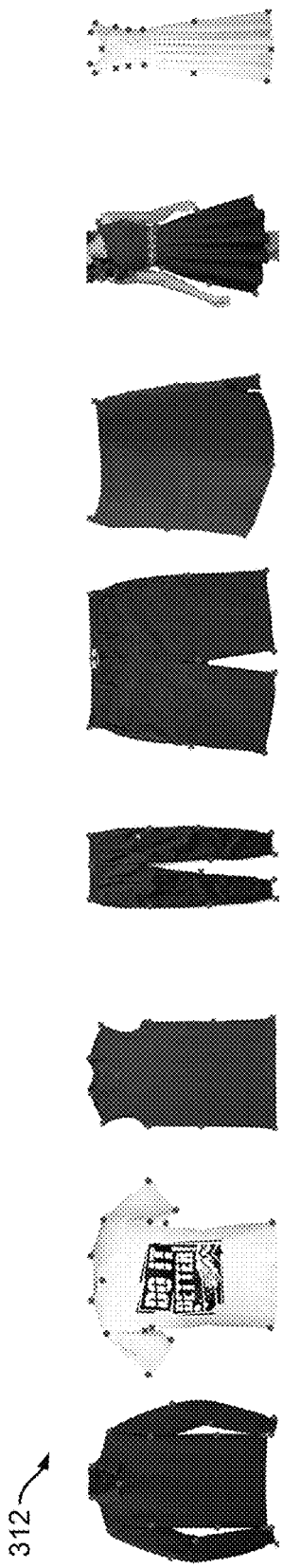
FIGS. 7A and 7B show examples of clothing types and the corresponding UV-map templates, respectively.
Figure 7B:

FIG. 7A shows some examples of the clothing images 312 in front views representing their clothing types (such as long sleeves, short sleeves, sleeveless, trousers, shorts, skirts, short dresses, and long dresses) and the keypoints thereof. FIG. 7B shows the UV-map templates corresponding to the clothing types shown in FIG. 7A and the keypoints thereof.

Figure 7C:
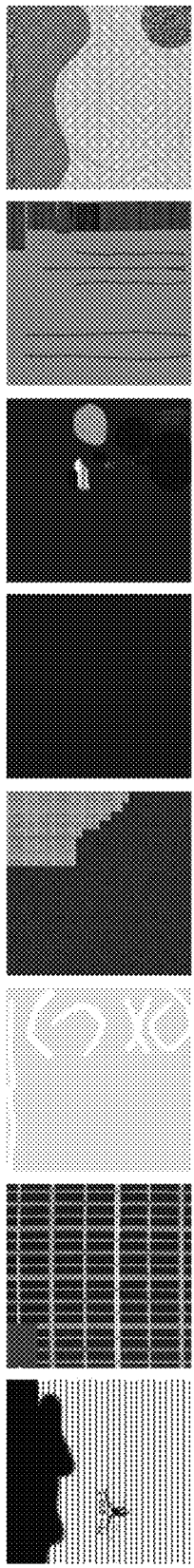
FIG. 7C shows examples of irregular UV-map templates.

Herein, a UV-map template is a map having the profile of a UV map but does not have the texture thereof or the texture thereof are usually unused (the texture thereof will be filled by the rendering subprocess 304). A UV-map template may be a regular UV-map template having clear structures for determining keypoints thereof (such as those shown in FIGS. 6 and 7B). On the other hand, a UV-map template may be an irregular UV-map template which has unclear structures for determining keypoints thereof ((such as those shown in FIG. 7C). Examples of irregular UV-map templates may be those generated by third-party designers using complicated or unknown algorithms. Irregular UV-map templates are usually not used in the training subprocess 302.

Those skilled in the art will appreciate that the keypoints 402 on a training clothing image 312 are annotated or labelled (for example, manually or as a result of previous performing of the rendering subprocess 304) before being used for training the one or more clothing & keypoint detection models 314. On the other hand, the clothing in a person image detected from a real-world image in the rendering subprocess 304 are not pre-annotated. Rather, the rendering subprocess 304 processes and annotates the clothing in the detected person image using the one or more trained clothing & keypoint detection models 314 to determine its clothing type, keypoints, and other related information. A UV-map template (which has predefined keypoints thereon) may be selected based on the determined clothing type, and a UV map may be generated based on the clothing image and the UV-map template. The 3D humanoid is then rendered using the generated UV map.

In these embodiments, the clothing detection model and the keypoint detection model are trained separately for the clothes models using the training clothing images 312. For example, the clothes detection model may be based on the faster RCNN (see Reference [8]) which predicts the bounding box localization and clothing category jointly. The keypoint detection model may be based on PIPNet (see Reference [9]) without the Neighbor Regression Module.

As those skilled in the art will appreciate, in addition to the training clothing images, the real-world images used by the rendering subprocess 304 and the rendering results thereof may also be used by the training subprocess 302 for training the clothing & keypoint detection models 314.

The trained clothing & keypoint detection models 314 are used by the rendering subprocess 304 for rendering 3D humanoids using real-world clothing images. As shown in FIG. 5, after receiving a real-world image 322, the computing device 100 detects the person therein and the pose of the person (step 362) to obtain a qualified person image 324.

After pose detection, the nonoccluded front-view person image is applied to the clothing & keypoint detection models 314 (step 364) for detecting the clothing of the person and the clothing type, position, and keypoints thereof. The person image 324 with the information of the clothing type, position, and keypoints of the clothing is then output as an "annotated" person image 324' (step 366) for rendering the 3D humanoid.

Herein, the person image 324 only shows one side of the clothing (for example, the front side of the clothing; denoted the "visible side" hereinafter) and the other side thereof is invisible (such as the rear side thereof; denoted the "invisible side" hereinafter). In these embodiments, the rendering subprocess 304 uses a registered clothing mapping method (also called a "registered texture mapping method" or a "registered mapping method" hereinafter) to generate the front-side clothing area 424A of a first UV map 330 (corresponding to the upper-body clothing) for rendering a first side (for example, the front side) of the humanoid using the clothing 326 of the "annotated" person image 324' (step 368), and uses a homogeneous clothing expansion method (also denoted a "homogeneous texture expansion method" or a "homogeneous expansion method" hereinafter) to generate the rear-side clothing area 424A and the background area 430 of the first UV map 330.

The rendering subprocess 304 also generates a second UV map 332 for rendering the lower body of the humanoid (step 370). For illustrative purposes, the second UV map 332 is generated using the homogeneous clothing expansion method.

At step 372, the two UV maps 330 and 332 are used to render the upper-body clothing and the lower-body clothing of the humanoid 334, respectively. At step 374, the rendered humanoid 334 is then used to generate synthesized images 336 of the humanoid, for example, in the Unity3D virtual environment (a 3D environment developed by Unity Technologies of San Francisco, California, USA).

C. POSE DETECTION AND PERSON-VIEW QUALIFICATION

In some embodiments, the computing device 100 uses the person-detection model disclosed in Reference [10] to detect the qualified person image 324 (that is, not an image of standalone clothing or an incomplete person image), wherein the detection threshold is set to 0.8 and the area of the detected bounding boxes is set to be at least 20% of the input image to remove low-resolution persons and some false positives. The detected person image 324 is cropped and then used for pose detection at step 362.

The detected person image 324 may be an image of the detected person at a specific viewpoint, such as a perspective front view (that is, a perspective view with a viewpoint close to the front view), a perspective rear view, or a perspective side view. In the following, the perspective front view, perspective rear view, and a perspective side view are also denoted the "front view", "rear view", and "side view" for simplicity. The front-view image may also be a nonoccluded front-view (that is, the clothing is not occluded by other objects) or an occluded front-view (that is, the clothing is at least partially occluded by other objects). In these embodiments, occluded front-views, rear views, and side views are considered incomplete displays of clothings and are noisy data that should not be used.

To reduce these noisy data, the computing device 100 uses a person-pose estimation model, such as the HRNet model (see Reference [11]) from MMDetection (see Reference [12]) trained on the Microsoft Common Objects in Context (COCO) dataset (which is a large-scale object detection, segmentation, key-point detection, and captioning dataset), for automatic person pose estimation. HRNet predicts 16 body keypoints, from which the computing device 100 in these embodiments uses 12 keypoints on the body, including shoulders, elbows, hands, hips, knees, and feet. Thus, the rear-view images may be identified and excluded based on the positions of the shoulders, side-view images may be identified and excluded based on the width-to-height aspect ratio of the upper body, and occluded front-view images may be identified and excluded based on the position of hands and elbows. The obtained person image 324 thus contains the persons' entire body and is completely visible.

In some embodiments, the person image 324 may be processed to remove the background content (that is, the non-clothing part of the person image 324) by for example, replacing the background content with a predefined color (such as black) with setting the background content to transparent, to reduce the influence of the background.

Figure 8A:
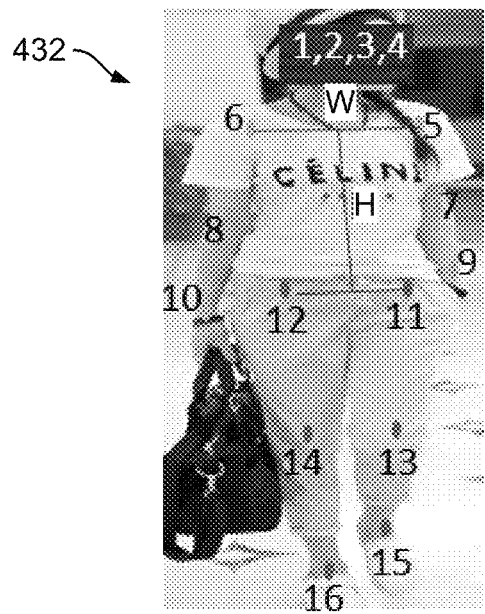
FIG. 8A shows an example of a person image with keypoints defined thereon, wherein the image shows the front view of the person therein.

FIG. 8A shows an example of a person image 432 with keypoints defined thereon and numbered from one (1) to 16 (also denoted as keypoints P1 to P16 hereinafter). In these embodiments, the keypoints P1 to P4 are keypoints on the person's face, P5 and P6 are left and right shoulder keypoints, respectively, P7 and P8 are left and right elbow keypoints, P9 and P10 are left and right hand keypoints, P11 and P12 are the separation keypoints separating the person's upper body and lower body, P13 and P14 are the left and right knee keypoints, and P15 and P16 are the left and right foot keypoints. The upper-body area of the person in the image 432 is defined by the keypoints P5, P6, P11, and P12. The lower-body area of the person in the image 432 is defined by the keypoints P11, P12, P13, and P14.

The computing device 100 classifies different situations according to the following rules:

1) Front view (FIG. 8A): The image is a front view (or more precisely, a perspective view close to the front view) of the person if the width to height aspect ratio W/H of the person's upper body is, for example, greater than or equal to 0.3, where the width W of the person's upper body is the Euclidean distance between the left and right shoulder keypoints P5 and P6, and the height H of the person's upper body is the Euclidean distance between the center of the line of the left and right shoulder keypoints P5 and P6 and the center of the line of the separation keypoints P11 and P12.

Figure 8B:
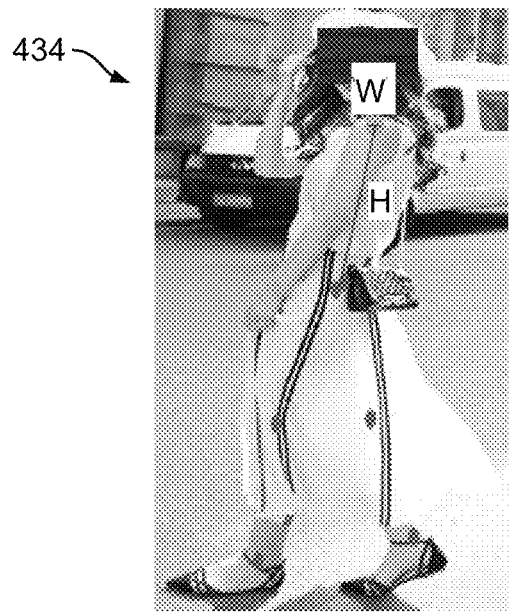
FIG. 8B shows an example of a person image with keypoints defined thereon, wherein the image shows the side view of the person therein.

2) Side view (FIG. 8B): The image is a side view (or more precisely, a perspective view close to the side view) of the person if the width to height aspect ratio W/H of the person's upper body is, for example, less than 0.3.

Figure 8C:
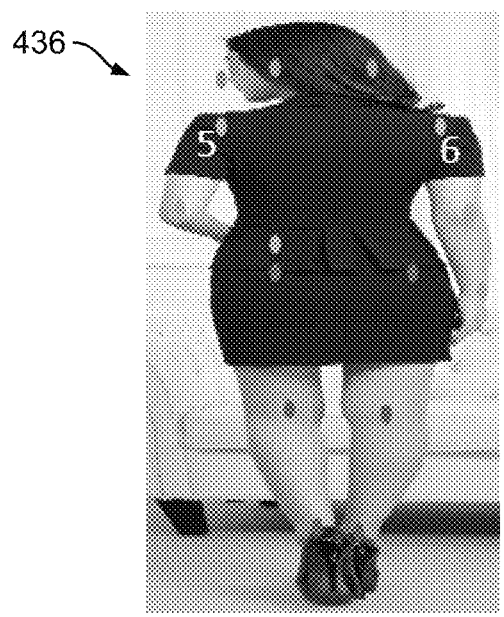
FIG. 8C shows an example of a person image with keypoints defined thereon, wherein the image shows the rear view of the person therein.

3) Rear view (FIG. 8C): The image is a rear view (or more precisely, a perspective view close to the rear view) of the person if the right shoulder keypoint P6 is on the right side of the left shoulder keypoint P5 on the image.

Figure 8D:
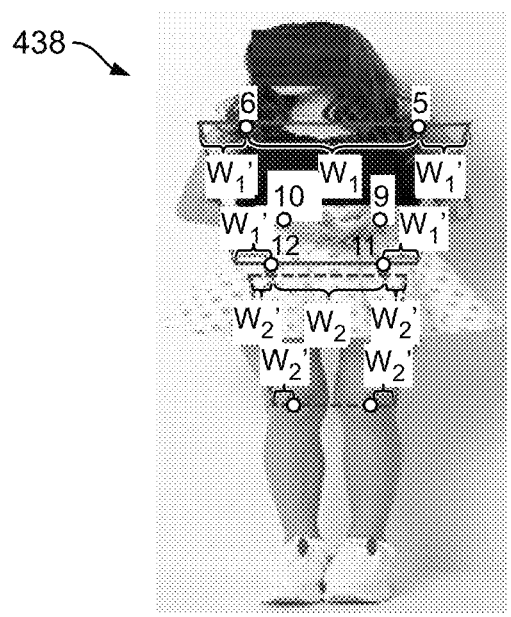
FIG. 8D shows an example of a person image with keypoints defined thereon, wherein the image shows the front view of the person therein and a portion of the clothing is occluded by the person's arms and hands.

4) Occluded view (FIG. 8D): The person in the image is occluded if at least one of the hand and elbow points (P7, P8, P9, and P10) is in the upper-body area or in the lower-body area.

In some embodiments, the upper-body and lower-body areas may be expanded in determining the occlusion in the rule 4) described above. In these embodiments, the width of each of the upper-body and lower-body areas is defined as the distance between the top-corner points thereof. For example, in the example shown in FIG. 8D, the width $W_1$ of the upper-body area is defined as the distance between the top-corner points P5 and P6 thereof. The width $W_2$ of the lower-body area is defined as the distance between the top-corner points P11 and P12 thereof.

The upper-body area and lower-body area are each horizontally expanded by 10% on each side thereof, that is, with an expansion width $W_1'=0.1 \times W_1$ and $W_2'=0.1 \times W_2$, respectively, on each side thereof. Then, the computing device 100 checks if any of the hand and elbow points P7, P8, P9, and P10 is in the horizontally expanded upper-body area or in the horizontally expanded lower-body area.

By using the above four rules, the person image 432 identified as the front view is accepted as the qualified person image 324, and the person images 434, 436, and 438 identified as the side view, rear view, and occluded view, respectively, are unqualified and rejected.

D. REGISTERED MAPPING METHOD

Figure 9:
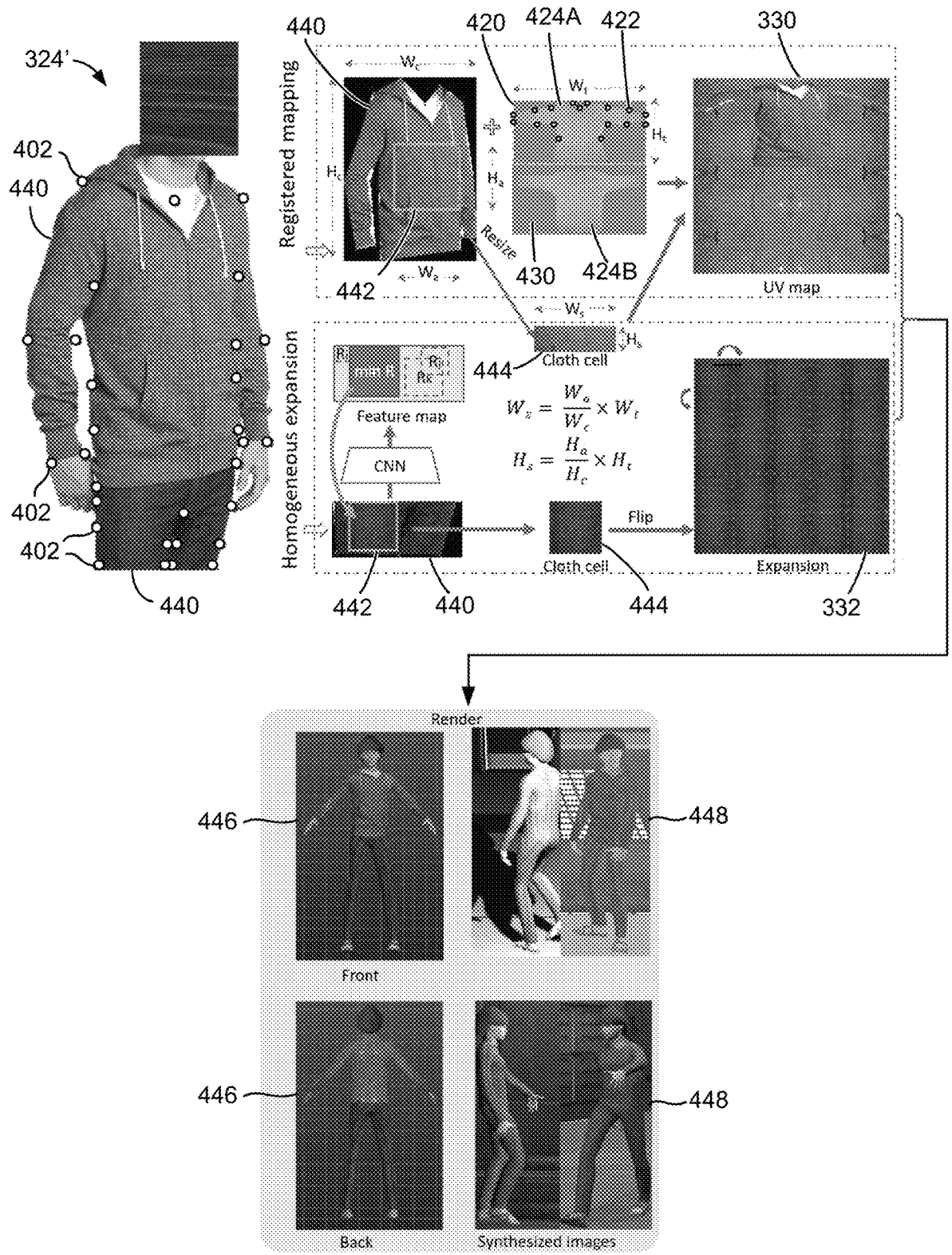
FIG. 9 shows an example of the process shown in FIG. 5.

With reference to the example shown in FIG. 9, after applying the nonoccluded front-view person image to the clothing & keypoint detection models 314 at step 364, the "annotated" person image 324' with the information of the clothing type, position, and keypoints 402 thereof is then output at step 366. A UV-map template 420 is then selected based on the clothing type (for example, randomly selecting a UV-map template if there exist a plurality of UV-map templates corresponding to the clothing type). In this example, the UV-map template 420 is a regular UV-map template and a registered mapping method is used at step 368 to generate the front-view clothing area 424A of a first UV map 330.

In these embodiments, the registered mapping method uses perspective homography (also known as a perspective transformation; see Reference [14]) to map the real-world clothing texture of the clothing 440 in the nonoccluded front-view person image 324' to the front-view clothing area 424A of the UV-map template 420 for generating the first UV map 330, so that the original, real-world texture structures in the clothing 440 may be well kept, and appear to be clear and sharp.

The perspective homography is defined as:

Given a set of 2D points $\{p_i\}$ and a corresponding set of points $\{p_i'\}$, augmented with homogeneous coordinates (appending one (1) as the z coordinate), perspective homography maps each $p_i$ to $p_i'$ (see Reference [15]) by a homography matrix $H \in R^{3 \times 3}$, that is, $p'=Hp$.

Thus, the homography matrix H may be calculated by solving the following optimization problem:

$$\min_H \sum_{i=1}^{n} \|p_i' - Hp_i\|_2^2, \quad (1)$$

where $p_i$ represents the keypoints 422 on the UV map, $p_i$ represents the keypoints 402 of the clothing 440 in the person image 324', and n is the number of the corresponding keypoints points $p_i$ or $p_i'$. The homography matrix H contains 3×3 entries, and is defined only up to a scale since the bottom-right entry is defined as one (1). Thus, the total number of degrees of freedom in H is eight (8), and therefore at least four pairs of corresponding points are required to compute the homography matrix H.

Equation (1) may be readily solved using the least-square method and using the keypoints $p_i$ (for example, keypoints 422 in FIG. 9) on the regular UV-map template 420 and the corresponding keypoints p$_i$' (for example, keypoints 402 in FIG. 9) in the person image 324' to obtain the homography matrix H. In addition, the computed homography matrix H may be refined with the Levenberg-Marquardt method (see Reference [16]) to further reduce the re-projection error.

After the homography matrix H, a perspective warping method is used to map each pixel of the person image 324' to the UV-map template 420 for generating the first UV map 330.

More specifically, each pixel location p on the UV-map template 420 has a corresponding pixel location on the person image 324', that is, p'=[x, y, z]$^T$=Hp, where the superscript T represents matrix/vector transpose, p is a pixel of the UV-map template, and p' is a pixel of the person image 324' at the coordinates (x, y, z) on the person image 324' where x and y are the coordinates on the person image 324' and z is a coordinate perpendicular to the person image 324'.

As described in above definition, in these embodiments, the z coordinate of all points is set to one (1) before the perspective warping process, as the transformation operates on homograph coordinates. That is, $$p' = \left(\frac{x}{z}, \frac{y}{z}\right).$$

Therefore, the computing device 100 may traverse the pixels of the UV-map template 420. For each pixel p of the front-view clothing area 424A of the UV-map template 420, the corresponding pixel p' of the person image 324' may be obtained as p'=Hp. The texture values (such as the color values) of the pixels surrounding p' are combined (for example, using a suitable interpolation method such as bilinear interpolation) to obtain the value of the pixel p of the front-view clothing area 424A of the UV-map template 420. After all pixels of the front-view clothing area 424A are traversed, the front-view clothing area 424A of the first UV map 330 is then built from the UV-map template 420 with the texture duplicated, copied, or mapped from the person image 324'. As will be described in more detail later, in these embodiments, the rear-view clothing area 424B and optionally the background area 430 of the first UV map 330 may be generated using the homogeneous expansion method (described below).

Those skilled in the art will understand that some clothing types such as the long-sleeves and trousers may exhibit significantly different appearances in person images 324' than their shapes in the first UV maps 330. Therefore, in some embodiments, such a clothing type may be divided into a plurality of parts. For example, the long-sleeve shirt may be divided into three parts (left sleeve, right sleeve, and body), and the trousers may be divided into two parts (left leg and right leg). The computing device 100 calculate a separate homography matrix H for each part and the above-described perspective homography is applied to each part of separately using the respective homography matrix H. Different parts of the first UV map 330 are then separately generated and are eventually combined to form the full first UV map 330.

E. HOMOGENEOUS EXPANSION

As described above, the registered mapping method is used for handling the clothing texture of one side (for example, the front side) of the humanoid based on a real-world person image. On the other hand, the clothing texture of the rear side of the clothing is usually invisible in the real-world person image. Considering that the clothing texture of the rear side of the clothing is often different from that of the frontal side, in these embodiments, the computing device 100 uses a homogeneous expansion method to render the rear-view clothing area 424B of the UV-map template 420 based on a homogeneous area of the clothing (that is, an area of the clothing having the smallest texture variation) in the real-world person image.

Figure 10:
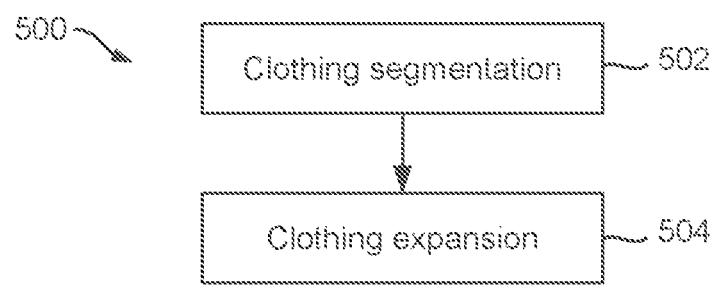
FIG. 10 is a flowchart showing a homogeneous expansion method used by the process shown in FIG. 5, according to some embodiments of this disclosure.

As shown in FIG. 10, the homogeneous expansion method 500 in some embodiments comprises a cloth segmentation step 502 for obtaining a realistic clothing cell and a clothing expansion step 504 for filling the second UV map 332 using the realistic clothing cell.

Also with reference to the example shown in FIG. 9, at the cloth segmentation step 502, the computing device 100 uses an optimization method to find a sufficiently large homogeneous area 442 on the clothing 440 (corresponding to the area 328 shown in FIG. 5) of the person image 324' (such as a homogeneous area having a size greater than a predefined area threshold), and uses the homogeneous area 442 as a realistic clothing cell 444.

More specifically, the computing device 100 first crops the person image 324' to the clothing area 440, and uses a neural network model trained on MSMT17 by QAConv 2.0 to extract a suitable feature map such as the layer-2 feature map (for example, having a size of 48×16) of the clothing image 440. Then, square blocks of various sizes are defined on the feature map, wherein the square blocks are candidates of the homogeneous area 442. Within each block, the average and standard deviation of the feature values are computed as follows:

$$\mu^k = \frac{1}{n_k}\sum_{i=1}^{n_k} p_i^k, \qquad (2)$$

$$\sigma_j^k = \sqrt{\frac{1}{n_k-1}\sum_{i=1}^{n_k}(x_{ij}^k - \mu_{ij}^k)^2} \qquad (3)$$

where k denotes the k-th block, $n_k$ is the number of elements in that block, $p_i^k \in R^d$ is the feature vector of the i-th element in block k, with, for example, d=512 dimensions, and j denotes the j-th dimension. Herein, the standard deviation is computed per feature channel. This value estimates the variations within each block, and thus reflects how homogeneous the clothing texture is within that block. In other words, a smaller standard deviation of the feature values of a block means that the clothing texture within the block is more homogeneous.

Moreover, it may be preferable to have the selected block (which is used as the homogeneous area 442) to be as large as possible. Therefore, the computing device 100 further computes the area $A_k$ of each block k, and defines a ratio R as the following objective function for optimization:

$$\min_{k=1}^{K} R_k = \frac{\frac{1}{d}\sum_{j=1}^{d}\sigma_j^k}{A_k}, \qquad (4)$$

where K denotes the number of blocks. By optimizing the above objective function, a block of the clothing image 440 is obtained, wherein the texture therewithin achieves the best trade-off between homogeneous and large areas (for example, the block with the smallest ratio between the standard deviation of the feature values thereof weighted by a first weight and the area thereof weighted by a second weight). Then, the computing device 100 locates this block in the person image 324' and crops it, thereby obtaining a patch which is used as a realistic clothing cell 444 for filling the rear-view clothing area 424B of the UV-map template 420.

As those skilled in the art will appreciate, the homogeneous cloth cell 444 may need to be scaled to align the generated clothing texture of the rear-view clothing area 424B with that of the front-view clothing area 424A so as to maintain the consistency of the textures of the clothing on both sides.

As shown in FIG. 9, let $W_c$ and $H_c$ be the width and height, respectively, of the clothes image 440, $W_a$ and $H_a$ be the width and height, respectively, of the homogeneous area 442 from the clothing image 440, $W_t$ and $H_t$ be the width and height, respectively, of the rear-view clothing area 424B in the UV-map template 420 after registered mapping, then, $W_s$ and $H_s$, the width and height, respectively, of the realistic clothing cell 444 to be scaled may be computed as follows:

$$W_s = \frac{W_a}{W_c} \times W_t, \quad (5)$$

$$H_s = \frac{H_a}{H_c} \times H_t, \quad (6)$$

Then, the scaled version of the clothing cell 444 is expanded to fill the rear-view clothing area 424B by alternately flipping and tiling the scaled version of the clothing cell 444 therein.

In some embodiments, the background area 430 of the UV-map template 420 may also be filled using the homogeneous expansion method. As those skilled in the art will appreciate, using the homogeneous expansion method to fill the background area 430 may be useful when the texture mapping function from UV map to 3D surfaces is complex and the function "irregularly" may pick some texture or color values from the background regions. Moreover, using the homogeneous expansion method to fill the background area 430 may help to compensate for artifacts or imperfections that may otherwise appear in rendering the 3D humanoid.

The first UV map 330 is then generated.

FIG. 9 also shows an example of generating a second UV map 332 for the lower-body clothing (for example, the pants). For illustrative purposes only, the UV-map template (not shown) selected for the lower-body clothing in FIG. 9 is an irregular UV-map template. Therefore, the homogeneous expansion method is used to identify a homogeneous area 442 and obtain a clothing cell 444 therefrom. In this example, the clothing cell 444 may not be scaled. Rather, the rendering subprocess 304 generates the second UV map 332 by alternately flipping and tiling the clothing cell 444 in the corresponding UV-map template.

After the first and second UV maps 330 and 332 are generated, they are used for rendering the upper-body and lower-body clothings of the humanoid using any suitable methods. FIG. 9 shows the example of rendered humanoids 446 and the synthesized images 448.

Those skilled in the art will appreciate that, in some embodiments, the clothing cell 444 is not scaled when fill the background area 430 of the UV-map template 420.

F. SIMILARITY-DIVERSITY EXPANSION

In some embodiments, there may exist a large number of images suitable for training the clothing & keypoint detection models 314 and may be used for rendering the 3D humanoid. In these embodiments, the computing device 100 may use a similarity-diversity expansion method to scale up virtual character creation while improving along both the similarity and diversity aspects.

By using the similarity-diversity expansion method, the computing device 100 first applies DBSCAN (see Reference [17]) to cluster person images based on the similarities of the person images (including the persons and their clothings) therein. Then, the computing device 100 samples a predefined number of images per cluster, and clones the clothings from the sampled images for 3D humanoid rendering. In this way, the computing device 100 may generate similar characters in the same cluster and diverse characters between different clusters.

In some embodiments, the same clothing & keypoint detection models 314 trained on MSMT17 by QAConv 2.0 are used to extract feature maps and compute similarity scores between person images for clustering person images. Then, DBSCAN is iteratively applied with different eps parameters to control the degree of similarity. Specifically, to remove images of duplicated persons, the computing device 100 may use eps=0.3 to cluster the same person with the same clothing. Then, the computing device 100 may select the image closest to the cluster center in each cluster and combine the selected images with other images failed to be clustered (for example, images with label "−1" (indicating failed to be clustered)) for the next round of clustering. Then, the computing device 100 further uses eps=0.6 to cluster person images, and selects a predefined number of image (such as five images) per cluster for character generation.

In some embodiments, the computing device 100 may use three strategies to create characters in equal proportions: 1) regular UV maps for the upper body and irregular UV maps for the lower body, 2) irregular UV maps for the upper body and regular UV maps for the lower body, and 3) irregular UV maps for the whole body.

The computing device 100 and methods disclosed herein may be used in various applications. For example, in some embodiments, the computing device 100 and methods disclosed herein may be used in generalization of person re-identification. As those skilled in the art will appreciate, one way to improve generalization performance is to develop large-scale and diverse source training datasets. However, collecting person images from surveillance videos is privacy sensitive, and data annotation thereof is expensive.

Synthetic person re-identification datasets may be used with the advantages of no privacy concern and no annotation cost. For example, Reference [1] teaches a system for automatically creating large-scale random 3D characters with 8,000 identities, rendered from simulation of surveillance environments in Unity 3D. It is also proved in Reference [1] that large-scale synthetic datasets are useful to improve generalization. Similar findings are also observed in the Reference [2]. However, synthesized persons in existing datasets are different from realistic persons because synthesized persons are often cartoon-like and dress in random collocation.

In some embodiments, by using the computing device 100 and methods disclosed herein, one may directly clone the entire clothings from real-world person images to virtual 3D characters or humanoids. The directly cloned clothing textures are clear and sharp in looking, and by cloning the entire clothing, the virtual person appears similar to its real-world counterpart, and in similar clothing and dress collocation.

Characters generated by using the computing device 100 and methods disclosed herein bridge the gap between synthesized and realistic persons, wherein the synthesized persons appear similar to their real-world counterparts. By using the registered mapping method and the homogeneous expansion method to generate the first and second UV maps 330 and 332, the generated 3D characters are clearer and are less limited to input sources, and the generation of the 3D characters is efficient in computation.

Those skilled in the art will appreciate that, various embodiments are readily available. For example, in some embodiments, the upper-body clothing such as the shirt, coat, or the like and the lower-body clothing such as the trousers, pants, skirt, or the like may be separately cloned and randomly combined to different 3D humanoids.

In above embodiments, real-world images are used for cloning the clothings therein to the 3D humanoids. In some other embodiments, any suitable images with qualified clothing images therein may be used for cloning the clothings therein to the 3D humanoids.

Those skilled in the art will appreciate that the methods disclosed herein may be selectively combined as needed, and one or more of the methods disclosed herein may be selectively combined with other methods such as the conventional 3D humanoid generation and/or rendering methods as needed.

Figure 11:
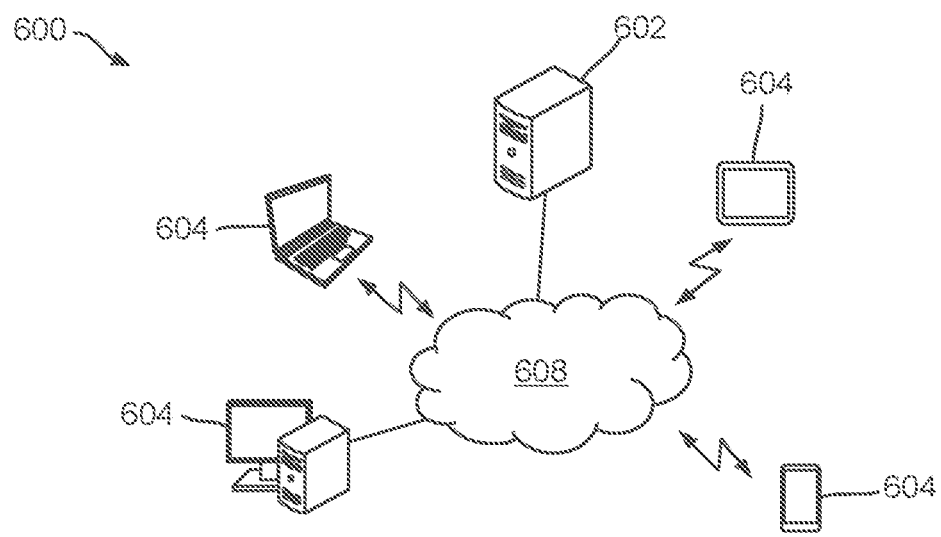
FIG. 11 is a schematic diagram of a computer network system, according to some embodiments of the present disclosure.

In above embodiments, the computing device 100 is used to perform the methods disclosed herein. In some other embodiments, the methods disclosed herein may be performed by a computer network system 600 shown in FIG. 11.

As shown, the computer network system 600 comprises one or more server computers 602 and one or more client-computing devices 604 functionally interconnected by a network 608 such as the Internet, a local area network (LAN), a wide area network (WAN), a metropolitan area network (MAN), and/or the like, via suitable wired and wireless networking connections.

The server computers 602 may be computing devices designed specifically for use as a server, and/or general-purpose computing devices acting as server computers while also being used by various users. Each server computer 602 may execute one or more server programs.

The client-computing devices 604 may be portable and/or non-portable computing devices such as laptop computers, tablets, smartphones, Personal Digital Assistants (PDAs), desktop computers, and/or the like. Each client-computing device 604 may execute one or more client application programs which sometimes may be called "apps".

Generally, the computing devices 602 and 604 have similar hardware and software structures as the computing device 100 shown in FIGS. 1 and 2.

In some embodiments, the one or more server computers 602 may perform the training subprocess 302 for training the one or more clothing & keypoint detection models 314 and perform the rendering subprocess 304 to generate 3D humanoids using the images provided by the one or more client-computing devices 604.

In some other embodiments, the one or more server computers 602 may perform the training subprocess 302 for training the one or more clothing & keypoint detection models 314. A client-computing device 604 may perform the rendering subprocess 304 to generate 3D humanoids using the images obtained from itself or from other client-computing devices 604 or the server computer 602.

Those skilled in the art will appreciate that the embodiments and examples described above are for illustrative purposes only and other variations are readily available. For example, in some embodiments, unlike the examples shown in FIGS. 5 and 9, the upper-body clothing may be rendered using the homogeneous expansion method and the front-side of the lower-body clothing may be rendered using the registered mapping method.

In some embodiments, the clothing in a person image 324 may be a rear-view clothing image and the rendering subprocess 302 uses the registered mapping method to render the rear side of the humanoid, and uses the homogeneous expansion method to render the front side of the humanoid.

In some embodiments, the clothing in a person image 324 may be a front-view clothing image and the rendering subprocess 302 uses the registered mapping method to render the rear side of the humanoid, and uses the homogeneous expansion method to render the front side of the humanoid.

In some embodiments, the clothing in a person image 324 may be a rear-view clothing image and the rendering subprocess 302 uses the registered mapping method to render the front side of the humanoid, and uses the homogeneous expansion method to render the rear side of the humanoid.

In some embodiments, the clothing in a person image 324 may be a clothing such as a long skirt for both the upper body and lower body of the 3D humanoid. Consequently, the rendering subprocess 304 only needs one UV map for rendering the 3D humanoid (instead of using two UV maps as shown in the examples of FIGS. 5 and 9).

In some embodiment, the homogeneous expansion method may also be used for filling a regular UV map template.

G. REFERENCES

[1] Wang, Yanan, Shengcai Liao, and Ling Shao. "Surpassing real-world source training data: Random 3d characters for generalizable person re-identification." Proceedings of the 28th ACM International Conference on Multimedia. 2020.

[2] Zhang, Tianyu, et al. "UnrealPerson: An Adaptive Pipeline towards Costless Person Re-identification." Proceedings of the IEEE/CVF Conference on Computer Vision and Pattern Recognition. 2021.

[3] Mir, Aymen, Thiemo Alldieck, and Gerard Pons-Moll. "Learning to transfer texture from clothing images to 3d humans." Proceedings of the IEEE/CVF Conference on Computer Vision and Pattern Recognition. 2020.

[4] Lazova, Verica, Eldar Insafutdinov, and Gerard Pons-Moll. "360-degree textures of people in clothing from a single image." 2019 International Conference on 3D Vision (3DV). IEEE, 2019.

[5] Kanazawa, Angjoo, et al. "Learning category-specific mesh reconstruction from image collections." Proceedings of the European Conference on Computer Vision (ECCV). 2018.

[6] Wang, Jian, et al. "Re-identification supervised texture generation." Proceedings of the IEEE/CVF Conference on Computer Vision and Pattern Recognition. 2019.

[7] Zhao, Fang, et al. "Human parsing based texture transfer from single image to 3D human via cross-view consistency." Advances in Neural Information Processing Systems 33 (2020).

[8] Shaoqing Ren, Kaiming He, Ross Girshick, and Jian Sun. "Faster r-cnn: Towards real-time object detection with region proposal networks." Advances in neural information processing systems, 28:91-99, 2015.

[9] Haibo Jin, Shengcai Liao, and Ling Shao. "Pixel-in-pixel net: Towards efficient facial landmark detection in the wild." International Journal of Computer Vision, September 2021.

[10] Irtiza Hasan, Shengcai Liao, Jinpeng Li, Saad Ullah Akram, and Ling Shao. Generalizable pedestrian detection. "The elephant in the room." In Proceedings of the IEEE/CVF Conference on Computer Vision and Pattern Recognition, pages 11328-11337, 2021.

[11] Ke Sun, Bin Xiao, Dong Liu, and Jingdong Wang. "Deep high-resolution representation learning for human pose estimation." In Proceedings of the IEEE/CVF Conference on Computer Vision and Pattern Recognition (CVPR), June 2019.

[12] Kai Chen, Jiaqi Wang, Jiangmiao Pang, Yuhang Cao, Yu Xiong, Xiaoxiao Li, Shuyang Sun, Wansen Feng, Ziwei Liu, Jiarui Xu, Zheng Zhang, Dazhi Cheng, Chenchen Zhu, Tianheng Cheng, Qijie Zhao, Buyu Li, Xin Lu, Rui Zhu, YueWu, Jifeng Dai, Jingdong Wang, Jianping Shi, Wanli Ouyang, Chen Change Loy, and Dahua Lin. "MMDetection: Open mmlab detection toolbox and benchmark." arXiv preprint arXiv: 1906.07155, 2019.

[13] Tsung-Yi Lin, Michael Maire, Serge Belongie, James Hays, Pietro Perona, Deva Ramanan, Piotr Doll'ar, and C Lawrence Zitnick. "Microsoft coco: Common objects in context." In European conference on computer vision, pages 740-755. Springer, 2014.

[14] Richard Szeliski. "Computer vision: algorithms and applications." Springer Science & Business Media, 2010.

[15] Alex M Andrew. "Multiple view geometry in computer vision." Kybernetes, 2001.

[16] KENNETH LEVENBERG. "A method for the solution of certain non-linear problems in least squares." Quarterly of Applied Mathematics, 2(2):164-168, 1944.

[17] Martin Ester, Hans-Peter Kriegel, J"org Sander, and Xiaowei Xu. "Density-based spatial clustering of applications with noise (dbscan)." In Proc. of the Second International Conference on Knowledge Discovery and Data Mining, pages 226-231, 1996.

Although embodiments have been described above with reference to the accompanying drawings, those of skill in the art will appreciate that variations and modifications may be made without departing from the scope thereof as defined by the appended claims.

What is claimed is:

1. A computerized method comprising:
generating a UV map having a texture determined based on a texture of a clothing image in an input image and having a profile determined based on a predefined UV-map template selected from a plurality of predefined UV-map templates, the texture of the UV map comprising one or more textures of one or more pixels of the UV map, and the texture of the clothing image comprising one or more textures of one or more pixels of the clothing image; and
rendering a three-dimensional (3D) character using the UV map;
wherein said generating the UV map comprises:
determining a plurality of first keypoints of the clothing image, and
generating the UV map by rendering a first clothing area of the UV-map template using the texture of the clothing image based on the plurality of first keypoints of the clothing image and a plurality of corresponding second keypoints of the first clothing area; or wherein said generating the UV map comprises:
determining a homogeneous block of the clothing image, the homogeneous block of the clothing image comprising an area of the clothing image having a minimum texture variation among areas of the clothing image, and
rendering a second clothing area of the UV-map template based on the determined homogeneous block.

2. The computerized method of claim 1, wherein said determining the plurality of first keypoints of the clothing image comprises:
determining the plurality of first keypoints of the clothing image using one or more artificial intelligence (AI) models.

3. The computerized method of claim 1, wherein said generating the UV map comprises:
determining a homography matrix based on the plurality of first keypoints of the clothing image and the plurality of second keypoints of the first clothing area; and
for each pixel of the first clothing area,
determining a corresponding location on the clothing image using the determined homography matrix, and
determining the texture of the pixel of the first clothing area based on the one or more textures of one or more pixels of the clothing image at or surrounding the determined location.

4. The computerized method of claim 3, wherein said determining the texture of the pixel of the first clothing area comprises:
determining the texture of the pixel of the first clothing area using interpolation of the textures of a plurality of pixels of the clothing image at or surrounding the determined location.

5. The computerized method of claim 1, wherein said determining the homogeneous block of the clothing image comprises:
extracting a feature map of the clothing image using a neural network model;
determining a plurality of blocks of various sizes on the feature map;
calculating standard deviation of feature values of each of the plurality of blocks;
calculating an area of each of the plurality of blocks; and
selecting one of the plurality of blocks, among the plurality of blocks, having a minimum ratio of a weighted standard deviation of the feature values thereof over a weighted area thereof as the homogeneous block.

6. The computerized method of claim 1, wherein said generating the UV map comprises said determining the homogeneous block of the clothing image and said rendering the second clothing area of the UV-map template; and
wherein said rendering the second clothing area of the UV-map template comprises:
scaling the homogeneous block, and
rendering the second clothing area of the UV-map template using the scaled homogeneous block.

7. The computerized method of claim 6, wherein said rendering the second clothing area of the UV-map template using the scaled homogeneous block comprises:
rendering the second clothing area of the UV-map template by alternately flipping and tiling the scaled homogeneous block in the second UV map.

8. The computerized method of claim 1 further comprising:
clustering a plurality of first images into one or more clusters at least based on similarities of person images in the first images;

sampling each of the one or more clusters to obtain one or more sampled first images; and using each of the one or more sampled first images as the input image for performing said generating the UV map and said rendering the 3D character to obtain a plurality of rendered 3D characters.

9. The method of claim 1, wherein the homogeneous block of the clothing image comprises an area of the clothing image having a minimum texture variation among areas of the clothing image, and a size greater than a predefined area threshold.

10. An apparatus comprising a processing structure for:
generating a UV map having a texture determined based on a clothing image in an input image and having a profile determined based on a predefined UV-map template selected from a plurality of predefined UV-map templates, the texture of the UV map comprising one or more textures of one or more pixels of the UV map, and the texture of the clothing image comprising one or more textures of one or more pixels of the clothing image; and rendering a three-dimensional (3D) character using the UV map;

wherein said generating the UV map comprises:
determining a plurality of first keypoints of the clothing image, and
generating the UV map by rendering a first clothing area of the UV-map template using the texture of the clothing image based on the plurality of first keypoints of the clothing image and a plurality of corresponding second keypoints of the first clothing area; or wherein said generating the UV map comprises:
determining a homogeneous block of the clothing image, the homogeneous block of the clothing image comprising an area of the clothing image having a minimum texture variation among areas of the clothing image, and
rendering a second clothing area of the UV-map template based on the determined homogeneous block.

11. The apparatus of claim 10, wherein the processing structure is further configured for:
clustering a plurality of first images into one or more clusters at least based on similarities of person images in the first images;
sampling each of the one or more clusters to obtain one or more sampled first images; and
using each of the one or more sampled first images as the input image for performing said generating the first UV map and said rendering the 3D character to obtain a plurality of rendered 3D characters.

12. One or more non-transitory computer-readable storage devices comprising computer-executable instructions, wherein the instructions, when executed, cause a processing structure to perform actions comprising:
generating a UV map having a texture determined based on a clothing image in an input image and having a profile determined based on a predefined UV-map template selected from a plurality of predefined UV-map templates, the texture of the UV map comprising one or more textures of one or more pixels of the UV map, and the texture of the clothing image comprising one or more textures of one or more pixels of the clothing image; and rendering a three-dimensional (3D) character using the UV map;

wherein said generating the UV map comprises:
determining a plurality of first keypoints of the clothing image, and
generating the UV map by rendering a first clothing area of the UV-map template using the texture of the clothing image based on the plurality of first keypoints of the clothing image and a plurality of corresponding second keypoints of the first clothing area; or wherein said generating the UV map comprises:
determining a homogeneous block of the clothing image, the homogeneous block of the clothing image comprising an area of the clothing image having a minimum texture variation among areas of the clothing image, and
rendering a second clothing area of the UV-map template based on the determined homogeneous block.

13. The one or more non-transitory computer-readable storage devices of claim 12, wherein said generating the UV map comprises:
determining a homography matrix based on the plurality of first keypoints of the clothing image and the plurality of second keypoints of the first clothing area; and
for each pixel of the first clothing area,
determining a corresponding location on the clothing image using the determined homography matrix, and
determining the texture of the pixel of the first clothing area based on the one or more textures of one or more pixels of the clothing image at or surrounding the determined location.

14. The one or more non-transitory computer-readable storage devices of claim 13, wherein said determining the texture of the pixel of the first clothing area comprises:
determining the texture of the pixel of the first clothing area using interpolation of the textures of a plurality of pixels of the clothing image at or surrounding the determined location.

15. The one or more non-transitory computer-readable storage devices of claim 12, wherein said determining the homogeneous block of the clothing image comprises:
extracting a feature map of the clothing image using a neural network model;
determining a plurality of blocks of various sizes on the feature map;
calculating standard deviation of feature values of each of the plurality of blocks;
calculating an area of each of the plurality of blocks; and
selecting one of the plurality of blocks, among the plurality of blocks, having a minimum ratio of a weighted standard deviation of the feature values thereof over a weighted area thereof as the homogeneous block.

16. The one or more non-transitory computer-readable storage devices of claim 12, wherein the instructions, when executed, cause the processing structure to perform further actions comprising:
clustering a plurality of first images into one or more clusters at least based on similarities of person images in the first images;
sampling each of the one or more clusters to obtain one or more sampled first images; and
using each of the one or more sampled first images as the input image for performing said generating the first UV map and said rendering the 3D character to obtain a plurality of rendered 3D characters.

17. The one or more non-transitory computer-readable storage devices of claim 12, wherein said determining the plurality of first keypoints of the clothing image comprises:

determining the plurality of first keypoints of the clothing image using one or more artificial intelligence (AI) models.

18. The one or more non-transitory computer-readable storage devices of claim 12, wherein said generating the UV map comprises said determining the homogeneous block of the clothing image and said rendering the second clothing area of the UV-map template; and wherein said rendering the second clothing area of the UV-map template comprises:
scaling the homogeneous block, and
rendering the second clothing area of the UV-map template using the scaled homogeneous block.

19. The one or more non-transitory computer-readable storage devices of claim 18, wherein said rendering the second clothing area of the UV-map template using the scaled homogeneous block comprises:
rendering the second clothing area of the UV-map template by alternately flipping and tiling the scaled homogeneous block in the second UV map.

20. The one or more non-transitory computer-readable storage devices of claim 12, wherein the homogeneous block of the clothing image comprises an area of the clothing image having a minimum texture variation among areas of the clothing image, and a size greater than a predefined area threshold.

* * * * *